(12) United States Patent
Wen et al.

(10) Patent No.: US 12,152,874 B2
(45) Date of Patent: *Nov. 26, 2024

(54) TAPE MEASURE

(71) Applicant: Stanley Black & Decker, Inc., New Britain, CT (US)

(72) Inventors: Hsiao-Ting Wen, Taichung (TW); Yo-Wen Hsiao, Taichung (TW); Chirag Kamani, West Hartford, CT (US); Daniel R. Seymour, Plainville, CT (US); Hui-Ting You, Taichung (TW)

(73) Assignee: Stanley Black & Decker, Inc., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,406

(22) Filed: Mar. 30, 2023

(65) Prior Publication Data

US 2023/0304783 A1 Sep. 28, 2023

Related U.S. Application Data

(63) Continuation of application No. 17/504,014, filed on Oct. 18, 2021, now Pat. No. 11,624,600, which is a continuation of application No. PCT/US2020/002864, filed on Apr. 17, 2020.

(60) Provisional application No. 62/836,220, filed on Apr. 19, 2019.

(51) Int. Cl.
*G01B 3/10* (2020.01)
*G01B 3/1005* (2020.01)
*G01B 3/1041* (2020.01)
*G01B 3/1056* (2020.01)

(52) U.S. Cl.
CPC ......... *G01B 3/1041* (2013.01); *G01B 3/1005* (2013.01); *G01B 3/1056* (2013.01)

(58) Field of Classification Search
CPC ... G01B 3/1041; G01B 3/1005; G01B 3/1056
USPC .................................................. 33/760, 769
See application file for complete search history.

(56) References Cited

U.S. PATENT DOCUMENTS

| | | | | |
|---|---|---|---|---|
| 3,443,316 A | * | 5/1969 | Edgell ................. | G01B 3/1005 242/381.3 |
| 4,067,513 A | * | 1/1978 | Rutty .................. | G01B 3/1041 242/379 |
| 4,479,617 A | * | 10/1984 | Edwards ............. | G01B 3/1005 242/380 |

(Continued)

*Primary Examiner* — George B Bennett
(74) *Attorney, Agent, or Firm* — Gabriel A. Haboubi

(57) ABSTRACT

A tape measure comprises a housing containing a tape, spring, reel, and hub, with first seal(s) to seal between the reel cartridge and the hub and/or to seal between the reel and the housing and/or a part fixed to the housing. An outermost coil of the spring may extend out of an opening in the reel and be attached to an innermost coil of the tape, and a second seal may be provided on the reel, to seal between the spring and the reel where the spring extends from the reel. Alternatively, the spring may be contained within the reel, and an outermost coil of the spring may be attached to an interior of the reel. An exterior of the reel may include an attachment portion to which an innermost coil of the tape is attached. The housing may be openable to enable contaminants to be removed from the housing.

15 Claims, 15 Drawing Sheets

(56) References Cited

U.S. PATENT DOCUMENTS

| | | | | |
|---|---|---|---|---|
| 5,832,622 A * | 11/1998 | Mann | G01B 3/1005 |
| | | | 33/765 |
| 7,377,050 B2 * | 5/2008 | Shute | G01B 3/1041 |
| | | | 33/761 |
| 8,567,085 B2 * | 10/2013 | Roeske | G01B 3/1041 |
| | | | 33/769 |
| 8,782,917 B2 * | 7/2014 | Hunsberger | G01B 3/1005 |
| | | | 33/767 |
| 10,422,616 B2 * | 9/2019 | Orsini | G01B 3/1005 |
| 10,836,603 B2 * | 11/2020 | Vitas | G01B 3/1041 |
| 11,391,555 B2 * | 7/2022 | Kang | G01B 3/1043 |
| 11,624,600 B2 * | 4/2023 | Wen | G01B 3/1043 |
| | | | 33/769 |
| 2004/0237326 A1 * | 12/2004 | Wang | G01B 3/1084 |
| | | | 33/760 |
| 2005/0253011 A1 * | 11/2005 | Liao | G01B 3/1005 |
| | | | 242/376.1 |
| 2007/0012812 A1 * | 1/2007 | Lin | G01B 3/1005 |
| | | | 242/379 |
| 2008/0263886 A1 * | 10/2008 | Kang | G01B 3/1005 |
| | | | 33/767 |
| 2018/0273341 A1 * | 9/2018 | Vitas | B65H 75/486 |
| 2023/0392915 A1 * | 12/2023 | Kang | G01B 3/1043 |

\* cited by examiner

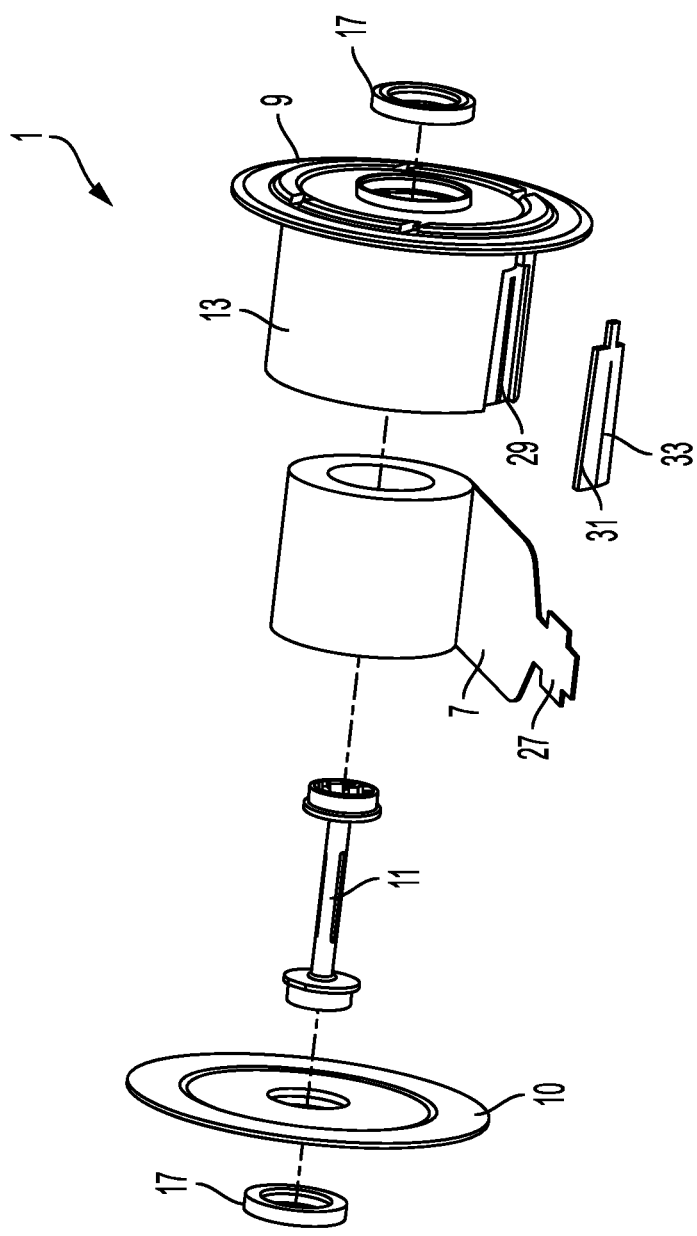
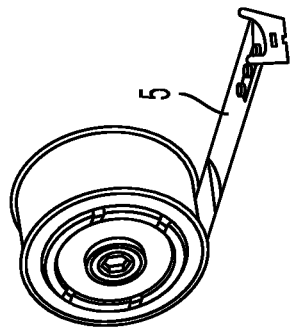
FIG. 1A
FIG. 1B

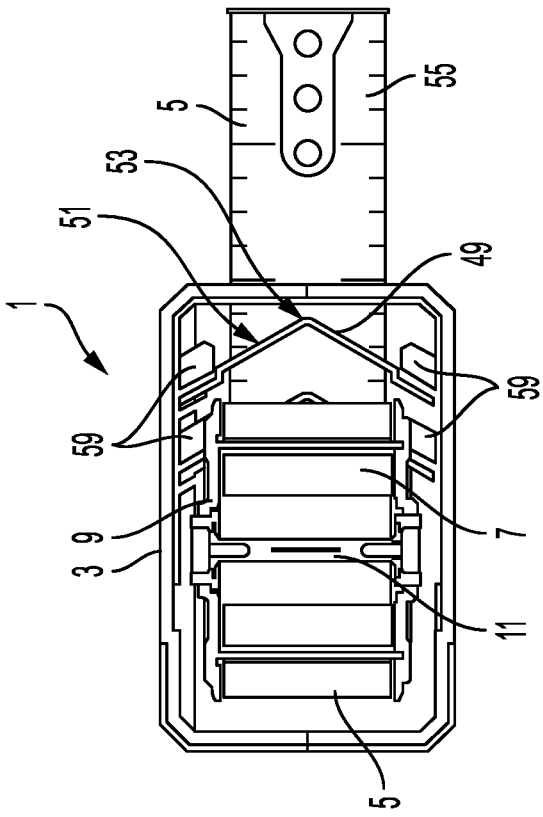
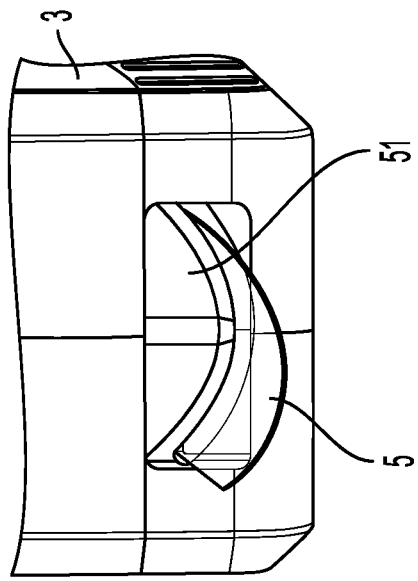
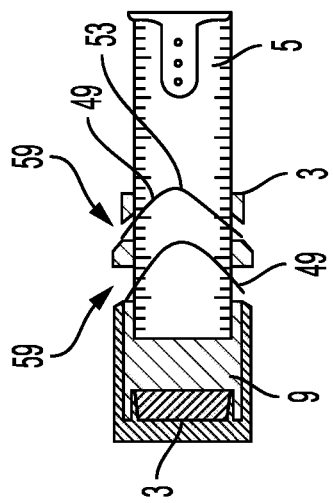
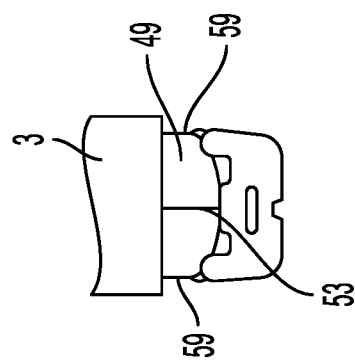
FIG. 8B
FIG. 8D
FIG. 8A
FIG. 8C

TAPE MEASURE

CROSS-REFERENCE TO RELATED APPLICATION

The present application is a continuation of U.S. patent application Ser. No. 17/504,014, filed on Oct. 18, 2021 and issuing as U.S. Pat. No. 11,624,600 on Apr. 11, 2023, which is a continuation of international application PCT/US2020/02864, filed on Apr. 17, 2020, which claims priority under 35 U.S.C. § 119 to U.S. Provisional Patent Application Ser. No. 62/836,220, filed on Apr. 19, 2019. Each of the above applications are hereby incorporated by reference in their entireties.

FIELD

The present invention relates to tape measures of the type comprising a housing containing a coiled elongate flexible measuring tape which is extendable from, and automatically retractable back into, the housing.

BACKGROUND

The invention, in its various aspects, seeks to solve the problem of dirt, dust and water (i.e. contaminant) ingress into the interior of a tape measure, by the prevention of such ingress and/or the removal of such contaminants.

SUMMARY OF THE INVENTION

An aspect of the invention provides a tape measure comprising a housing; and contained in the housing: an elongate flexible measuring tape, an elongate flexible spring member, a hollow reel cartridge, and a hub member. The hub member preferably is non-rotatably or rotatably attached to, or part of, the housing and extends through the reel cartridge along a rotational axis of the reel cartridge. The reel cartridge preferably is mounted on, and/or surrounds at least part of, the hub member and is rotatable with respect to the hub member and/or the housing. The measuring tape preferably is coiled around an external surface of the reel cartridge. The spring member preferably is coiled inside the housing, for example coiled inside the reel cartridge and/or around the hub member such that the spring member, preferably an innermost coil portion of the spring member, is connected directly or indirectly to the hub member, e.g. attached to the hub member. The housing, which preferably is formed from a plurality of housing parts, and may include a plurality of chambers, for example, preferably includes an opening through which the measuring tape may be extended from the housing, and automatically retracted into the housing.

It is to be understood that any feature, including any preferred or otherwise optional feature, of any aspect of the invention may be a feature, including a preferred or otherwise optional feature, of any other aspect of the invention. Each of the following preferred (or otherwise optional) features may be utilized alone with the above aspect of the invention, or with the above aspect of the invention and with any combination of one or more other preferred (or otherwise optional) features of the invention, for example.

One or more seal members preferably is provided, e.g. on the reel cartridge, to seal between the reel cartridge and the hub member and/or to seal between the reel cartridge and the housing and/or a part fixed to the housing. The, or each, seal member for sealing between the reel cartridge and the hub member preferably has a generally circular shape, e.g. it may generally be in the form of an O-ring. The, or each, such seal member preferably is formed, at least in part, from elastomeric material. The, or each, such seal member may include one or more generally rigid support members and/or spring members, e.g. formed from metal. Any such support members may have a generally circular shape, for example. The, or each, such seal member may include at least one sealing lip, for example. Preferably, the, or each, such seal member may have a generally U-shaped radial cross-section. The, or each, such seal member may be arranged to rotate with the reel cartridge with respect to the hub member and/or the housing.

An outermost coil portion of the spring member preferably extends out of the reel cartridge through an opening in the reel cartridge and is attached to an innermost coil portion of the measuring tape. A seal member preferably is provided on the reel cartridge, to seal between the spring member and the reel cartridge where the spring member extends out of the reel cartridge. The seal member may be elongate, for example. The seal member preferably comprises an elastomeric part. The seal member preferably includes a slit through which the outermost coil portion of the spring member extends. The seal member may be attached to the reel cartridge by inter-engagement, e.g. interlocking engagement, therewith.

Alternatively, the spring member may preferably be completely contained within the reel cartridge, and an outermost coil portion of the spring member may be attached to an interior portion of the reel cartridge. Preferably, an external surface of the reel cartridge includes an attachment portion to which an innermost coil portion of the measuring tape is attached. Preferably, the attachment portion comprises one or more protrusions. The attachment portion may comprise one or more fingers and/or barbs, for example. At least part of the attachment portion may be flexible, for example. The innermost coil of the measuring tape preferably includes at least one attachment portion, e.g. at least one opening and/or protrusion, for attaching the measuring tape to the reel cartridge.

Preferably, the measuring tape and/or the spring member is/are formed from metal. The measuring tape may include a polymeric coating, for example. The measuring tape preferably includes a measurement surface, i.e. a major surface of the tape having measurement indicia printed or otherwise applied thereon or therein. Preferably, the housing and/or the reel cartridge and/or the hub is/are formed from polymer material and/or metal. The reel cartridge preferably comprises a substantially cylindrical part (open at both ends, or closed at one end) and one or two substantially disc-shaped cap part(s) attached to the cylindrical part to close the reel cartridge with the spring member contained within the reel cartridge.

In some preferred embodiments of the invention, the housing is openable to enable contaminants (which may have entered the housing during use of the tape measure) to be removed from the housing. The housing preferably is openable by means of a part of the housing being pivotably and/or slidably and/or flexibly attached to, and movable with respect to, the remainder of the housing. Preferably the openable part of the housing is located at an underside of the housing (i.e. a portion of the housing which is normally the underside during normal use of the tape measure) and/or adjacent to the opening in the housing through which the measuring tape may be extended from, and automatically retracted into, the housing. For example, the openable part of the housing may be hinged (or otherwise pivotable or flexible) on one side of the housing and latchable to the remainder of the housing on an opposite side of the housing. The opposite sides of the housing may be on opposite sides of the coiled measuring tape, for example. The openable part of the housing may be latched to the remainder of the housing by means of a sliding latch, for example. Dust or other contaminants may be removed from the housing when the openable part of the housing is opened, with the aid of an auxiliary tool, for example a brush or an air gun.

In some preferred embodiments of the invention, the housing may contain one or more wipers configured to wipe contaminants from the measuring tape as the measuring tape is retracted into the housing. The, or each, wiper may be formed, at least in part, from an elastomeric material and/or formed as a brush (e.g. with bristles), for example. The, or each, wiper may have a generally V-shaped front face which faces towards the front opening in the housing (i.e. the front opening through which the measuring tape may be extended from, and automatically retracted into, the housing). The apex of the V-shape (where present) preferably extends substantially perpendicular to the measurement surface of the measuring tape, such that the portions of the wiper front face on each side of the apex are angled at least slightly backwards away from the front opening in the housing. There may be one or more wipers adjacent to the measurement surface of the measuring tape and/or adjacent to the opposite, underside, surface of the measuring tape. For example, there may be a plurality of wipers arranged spaced apart from each other in the direction away from the front opening in the housing. The, or each, wiper preferably is shaped and arranged to provide substantial contact with the measurement tape, e.g. shaped to correspond to a U-shaped profile of the measurement tape. The, or each, wiper may be attached to the housing by slotting into lateral grooves provided on the housing, for example.

Additionally or alternatively, there may be one or more side openings in the housing, adjacent to one or more corresponding wiper front face(s), to allow contaminants wiped from the measuring tape to be expelled from the housing. For those embodiments in which the, or each, wiper has a generally V-shaped front face, the V-shape may cause the contaminants to be automatically expelled from the housing through the side opening(s) as the measuring tape is retracted into the housing.

In some preferred embodiments of the invention, the housing may include one or more rollers configured to contact the measurement surface and/or the opposite major surface of the measuring tape as the measuring tape is retracted into the housing. The, or each, roller may have an adherent (e.g. "sticky") surface arranged to remove dust or other contaminants from the measuring tape as the measuring tape is retracted into the housing (e.g. similar to the action of a lint roller for removing lint from clothing). Advantageously, there may be at least one roller adjacent to the (upper) measurement surface of the measuring tape, and at least one additional roller adjacent to the opposite (lower) major surface of the measuring tape. Preferably, rollers adjacent to opposite major surfaces of the measuring tape are directly opposite each other, such that a plane extending through their rotational axes is substantially perpendicular to the major surfaces of the measuring tape. In some preferred embodiments, at least one roller is movable towards and away from the measuring tape. For example, a roller adjacent to the lower major surface of the measuring tape may be resiliently biased to be spaced apart from the measuring tape, but may be movable into contact with the measuring tape against the resilient bias; to this end, the movable roller may be mounted on a movable part which is accessible to the user from the exterior of the housing, and movable by the user with respect to the housing against the resilient bias. The rollers may therefore be squeezed against opposite major surfaces of the measuring tape, for example. The roller(s) may be shaped to correspond to the cross-sectional profile of the measuring tape, e.g. an upper roller may be substantially barrel-shaped, and preferably a lower roller may be inverse barrel-shaped (i.e. part "hour glass" shaped) to conform to a U-shaped profile of the measuring tape.

DESCRIPTION OF THE DRAWINGS

Embodiments of the invention will now be described, by way of example, with reference to the accompanying drawings, of which:

FIG. 1A shows components from a first embodiment of the invention in exploded view; while FIG. 1B shows the components as assembled;

FIG. 2A shows an illustration of a seal member of a first embodiment of the invention; while

FIG. 3A shows part of the first embodiment of the invention while

FIGS. 8A, 8B, 8C, and 8D show illustrations of parts of a fourth embodiment of the invention;

Like reference numerals indicate like, or functionally similar, parts.

DETAILED DESCRIPTION

Figure 9B:
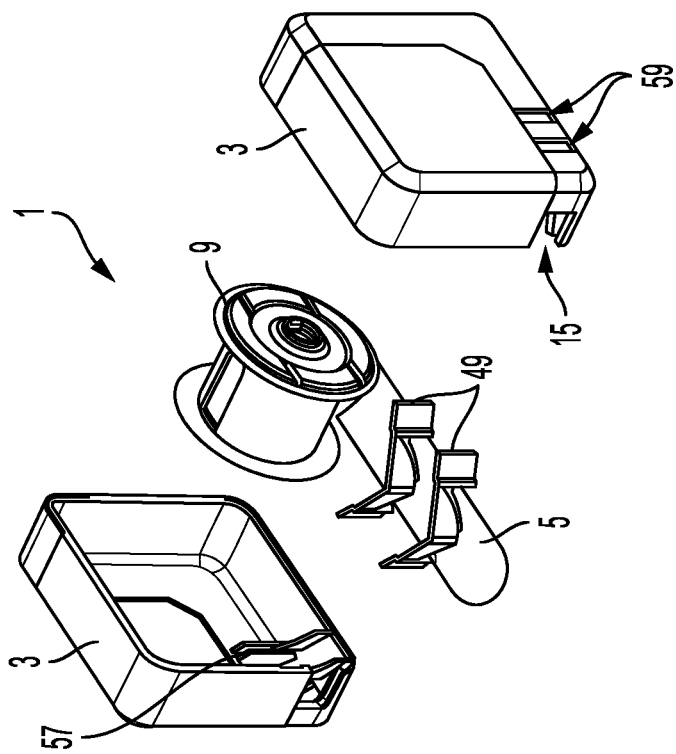
FIGS. 9A and 9B shows further illustrations of the fourth embodiment of the invention.
Figure 9A:
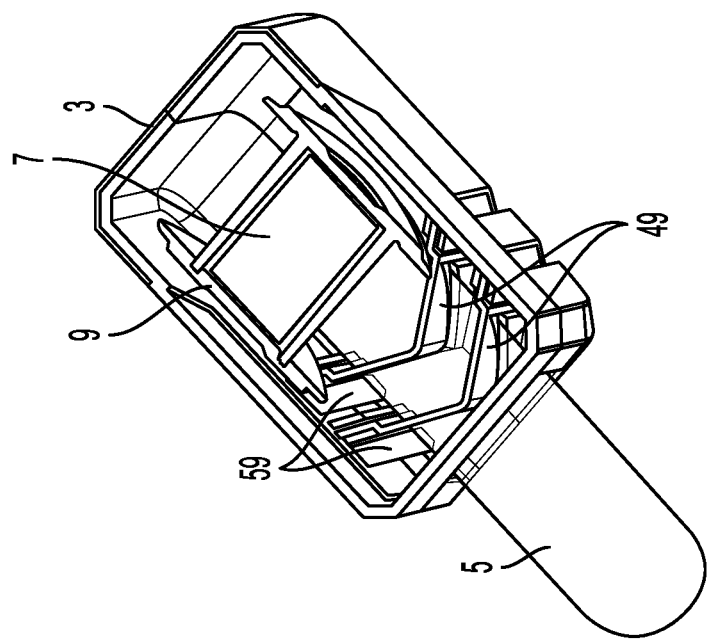
Figure 10:
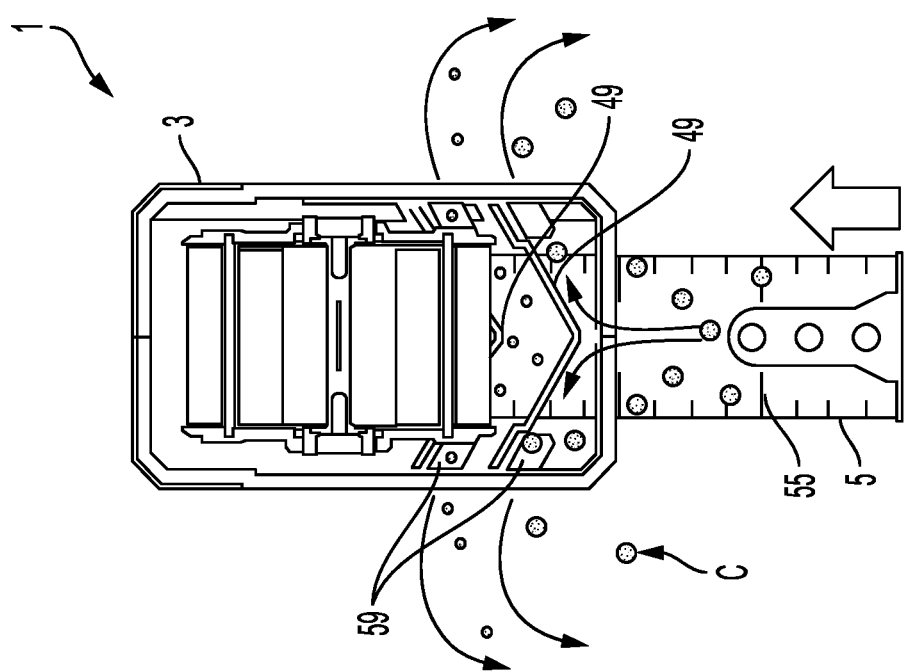
FIG. 10 shows another illustration of the fourth embodiment of the invention.

FIG. 1A shows internal component parts of a first embodiment of a tape measure 1 according to the invention. FIG. 1B shows the internal components of FIG. 1A assembled together. The housing 3 of the tape measure 1 is not shown in FIG. 1A-B, but reference is made to FIG. 6B, FIG. 9B and FIG. 11, for example, which show the housing 3 of other embodiments of the invention. The tape measure 1 comprises a housing 3 and contained in the housing 3 are an elongate flexible measuring tape 5, an elongate flexible spring member 7 (e.g., a spring), a hollow reel cartridge 9 (e.g. a reel), and a hub member 11 (e.g., a center hub). In use, the hub member 11 is non-rotatably attached to the housing 3 and extends through the reel cartridge 9 along the rotational axis of the reel cartridge. The reel cartridge 9 is mounted on, and surrounds at least part of, the hub member 11 and is rotatable with respect to the hub member 11 and the housing 3. The reel cartridge 9 comprises a substantially cylindrical part which is closed at one end, and a substantially disc-shaped cap part 10 attached to the cylindrical part to close the reel cartridge 9 with the spring member 7 contained within the reel cartridge 9. The measuring tape 5 is coiled around the cylindrical external surface 13 of the reel cartridge 9. The spring member 7 is coiled inside the reel cartridge 9 such that an innermost coil portion of the spring member is attached to the hub member 11. The housing 3 includes an opening 15 through which the measuring tape 5 may be extended from the housing, and automatically retracted into the housing.

Figure 2B:
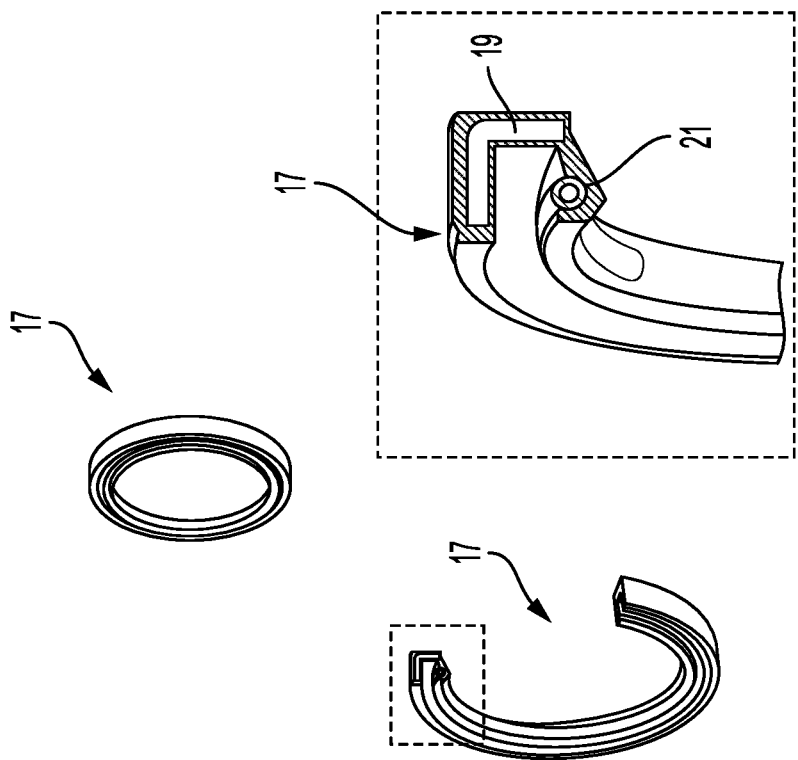
FIG. 2B shows illustrations of a seal member according to a second embodiment of the invention.
Figure 2A:
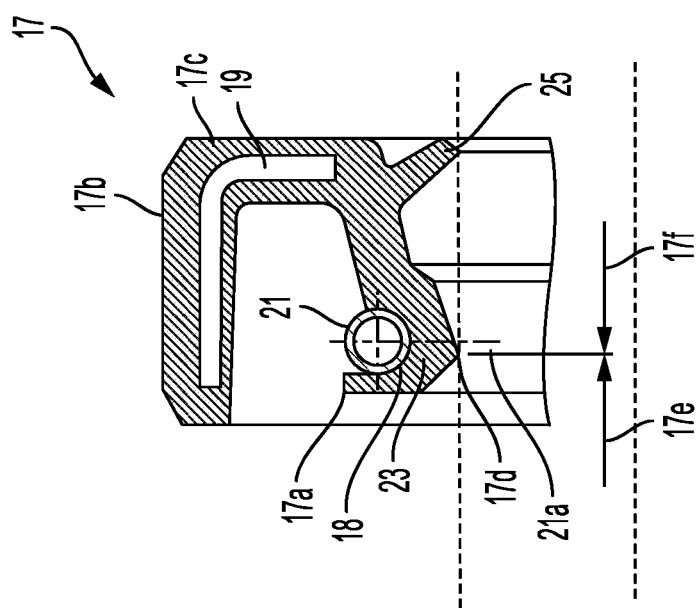

The tape measure 1 of FIG. 1A-B includes three seal members on the reel cartridge 9. Specifically, the tape measure 1 includes two seal members 17 (e.g., each a rotary seal) for sealing between the reel cartridge 9 and the hub member 11, and these have a generally circular shape, i.e. they are generally in the form of O-rings. The O-ring seal members 17, which are shown in more detail in the embodiments of FIG. 2A and FIG. 2B, are formed in part from elastomeric material (e.g. as a membrane), and they each include a generally rigid, generally circular, support member 19 (e.g., a metal insert), and a generally circular spring member 21 (e.g., a garter spring), both formed from metal. The spring member 21 may be retained in a spring groove 18 formed on a spring retaining lip 17a. The positioning of the spring member 21 in the spring groove 18 may define a spring plane 21a. The O-ring seal member 17 may include an outer diameter 17b, a rear face 17c, and a lip edge 17d. The lip edge 17d may define a boundary between an oil side 17e and an air side 17f of the O-ring seal member 17. Each O-ring seal member 17 also includes a sealing lip 23 and a dust lip 25, and has a generally U-shaped radial cross-section, as shown in FIG. 2(a). Each O-ring seal member 17 is arranged to rotate with the reel cartridge 9 with respect to the hub member 11 when the tape measure 1 is used. However, in other embodiments, the O-ring seal members 17 could remain stationary on the hub member 11 during use, or they could be free to rotate, or not, with the reel cartridge (depending on frictional forces, etc.).

Figure 3B:
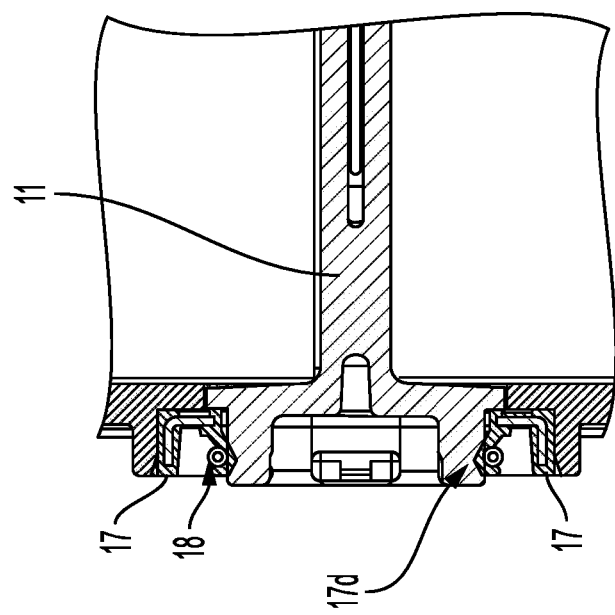
FIG. 3B shows a cross sectional view of the part.
Figure 3A:
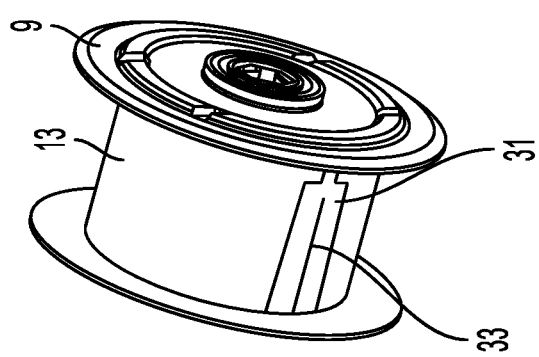
Figure 4:
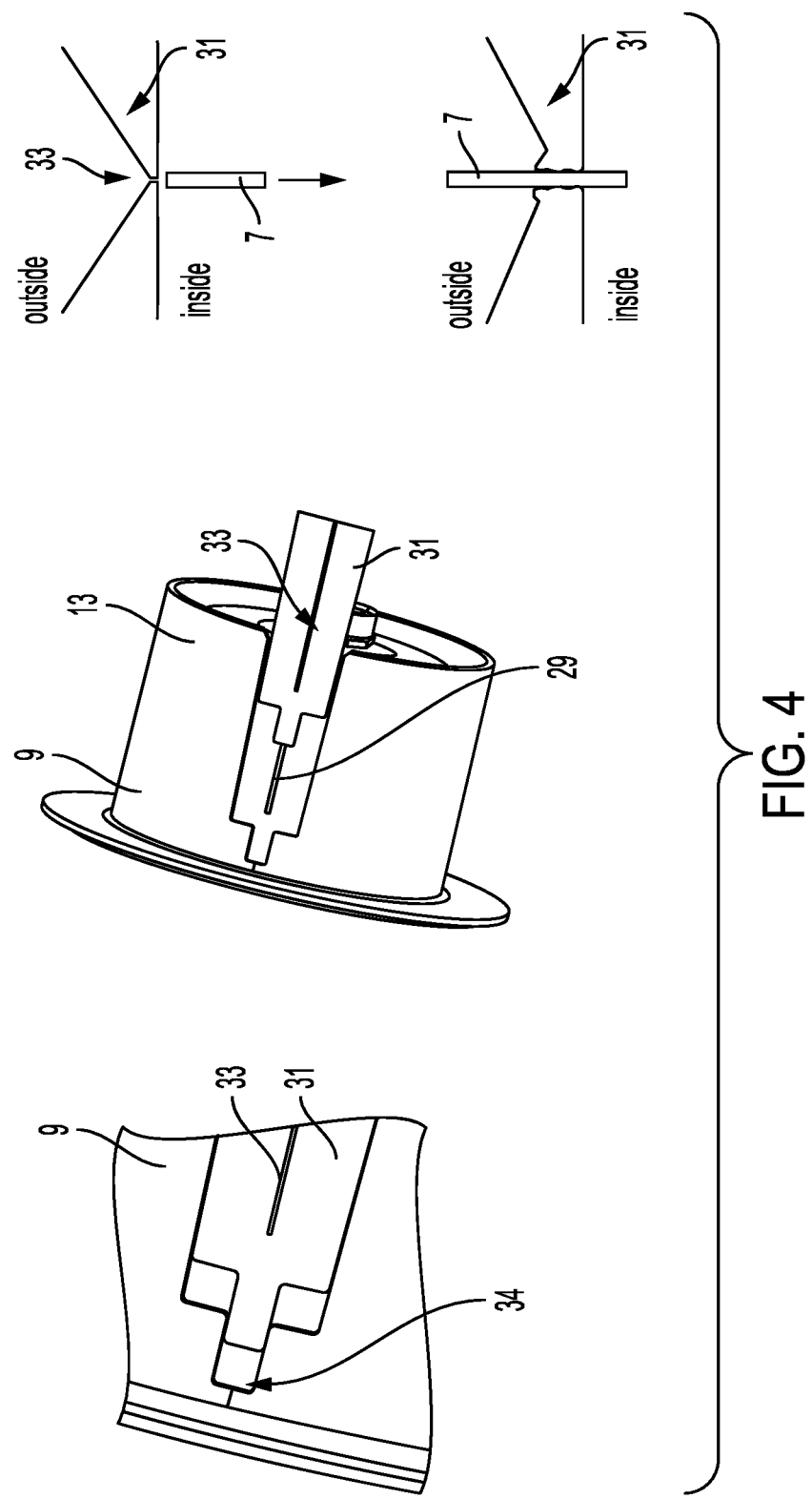
FIG. 4 shows further illustrations of part of the first embodiment of the invention.

As shown in FIGS. 3A and 3B, when the cap 10 and reel 9 are rotating, spring groove 18 may make contact via lip edge 17d with the hub member 11 consistently. Lip edge 17d can prevent water and dirt from the outside. Further, an interference fit may be used to assemble the rotary seal. An outermost coil portion 27 of the spring member 7 of the embodiment of FIG. 1A to FIG. 4 extends out of the reel cartridge 9 through an opening 29 in the reel cartridge and is attached to an innermost coil portion of the measuring tape 5. An elongate elastomeric seal member 31 (e.g., a seal slice) is provided on the reel cartridge 9, to seal between the spring member 7 and the reel cartridge 9 where the spring member 7 extends out of the reel cartridge. The elongate seal member 31 includes a slit 33 through which the outermost coil portion 27 of the spring member 7 extends. As shown in FIG. 4, reel cartridge 9 may include a cavity 34 which may match a shape of the elongate seal member 31 to fix the elongate seal member 31 therein. Thus, the elongate seal member 31 is attached to the reel cartridge 9 by interlocking engagement therewith. As further shown, the slot design for water sealing may be configured so that the spring member 7 may be received in the slit 33 of the elongate seal member 31 with an interference fit after spring assembly to prevent water and dirt from getting into the cartridge inside.

Figure 5B:
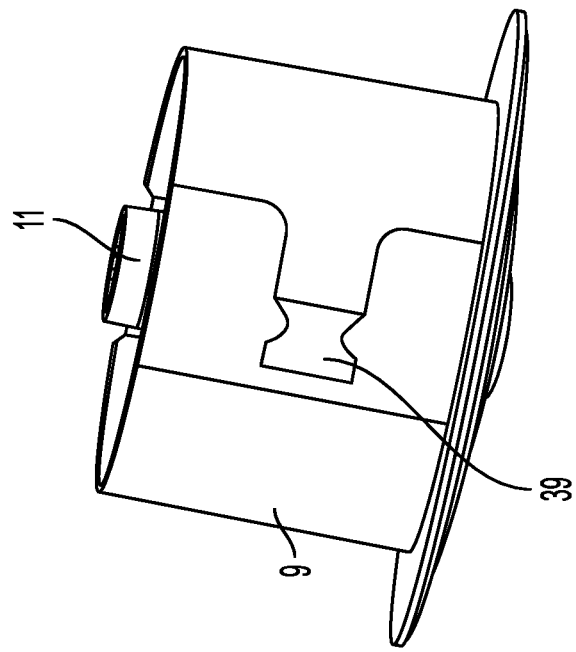
FIGS. 5A and 5B show illustrations of part of the second embodiment of the invention.
Figure 5A:
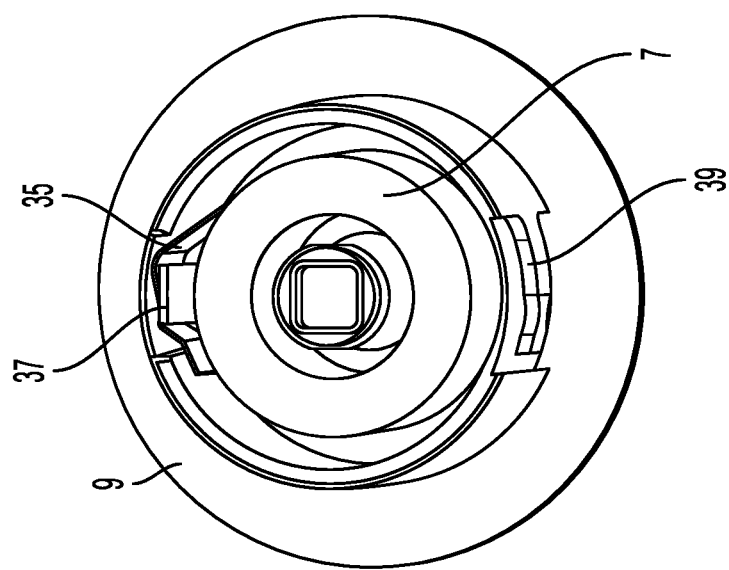

FIG. 5A and FIG. 5B show parts of a second embodiment of the invention which is similar to the first embodiment of FIGS. 1A to 4, except that in this embodiment the spring member 7 is completely contained within the reel cartridge 9, and an outermost coil portion 35 of the spring member 7 is attached to an interior portion of the reel cartridge 9 via an attachment portion 37 in the interior of the reel cartridge 9. An external surface of the reel cartridge 9 includes an attachment portion 39 in the form of a protruding finger or hook structure, to which an innermost coil portion of the measuring tape 5 is attached. The innermost coil of the measuring tape 5 includes a corresponding attachment portion in the form of an opening, for attaching the measuring tape 5 to the reel cartridge 9. By keeping separate the spring and the blade, the winding spring keeps inside the reel.

Figure 6A:
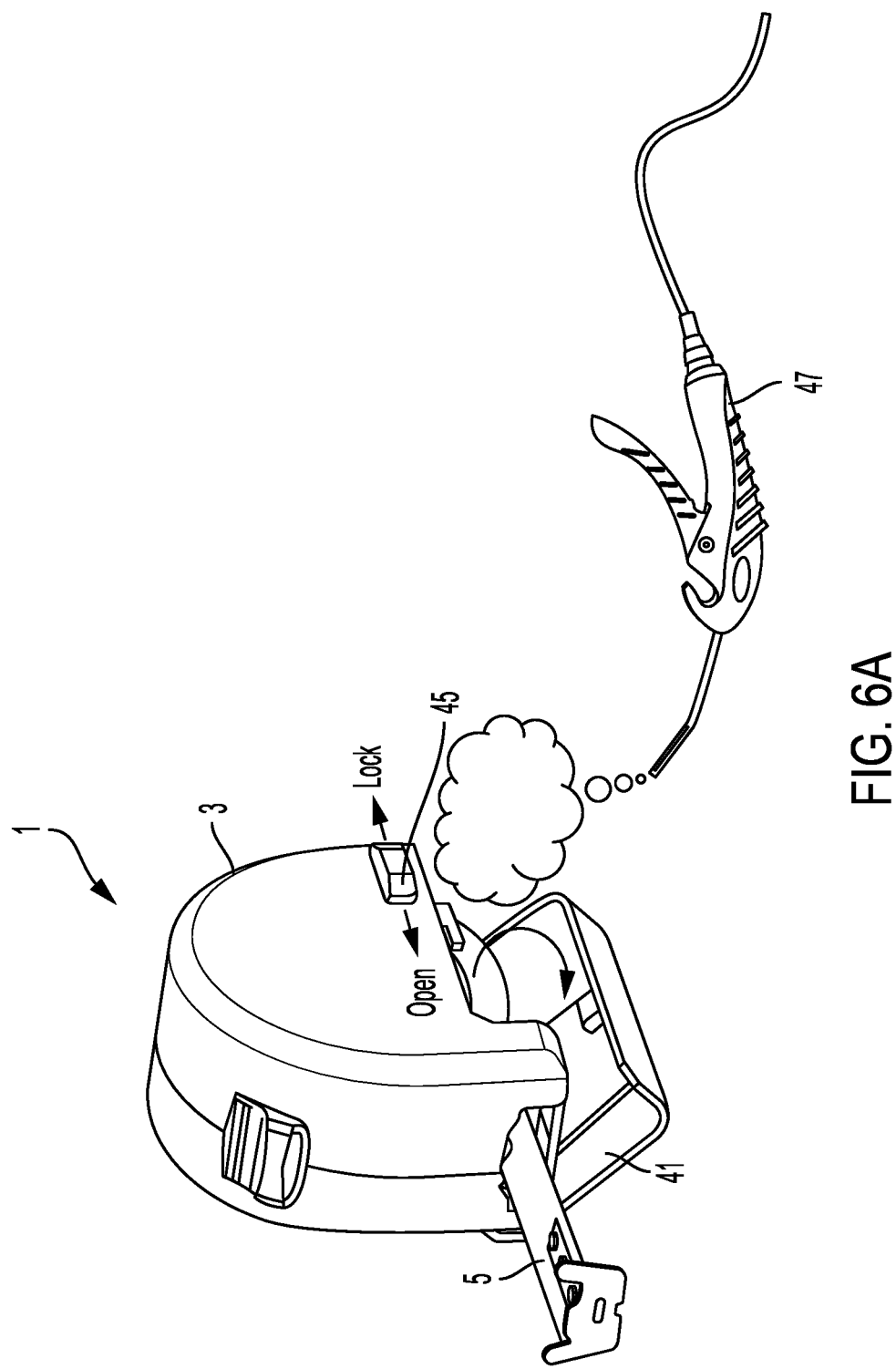
FIGS. 6A and 6B show illustrations of a third embodiment of the invention.
Figure 6B:
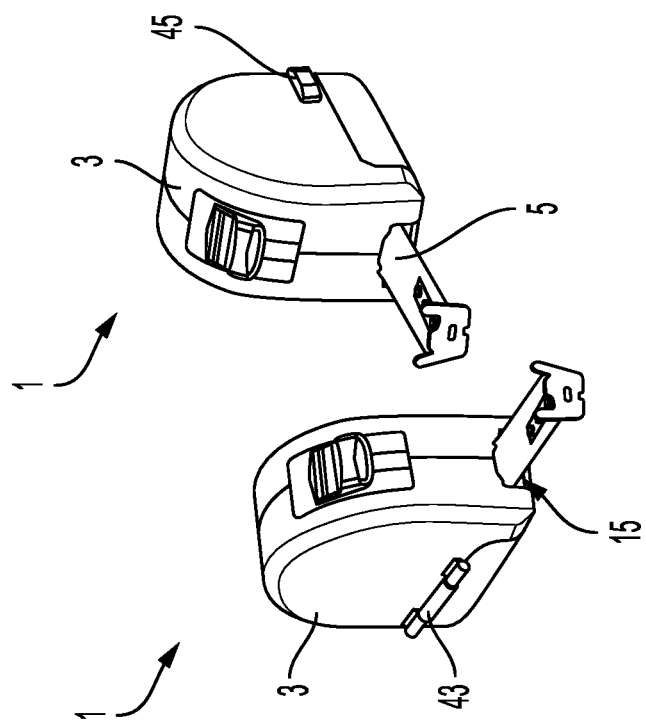
Figure 7B:
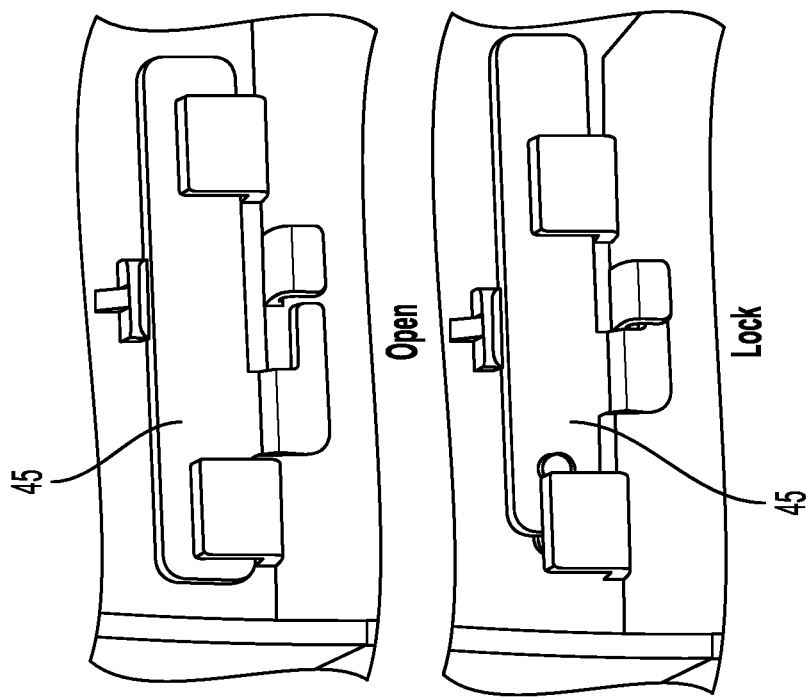
FIGS. 7A and 7B show illustrations of parts of the third embodiment of the invention.
Figure 7A:
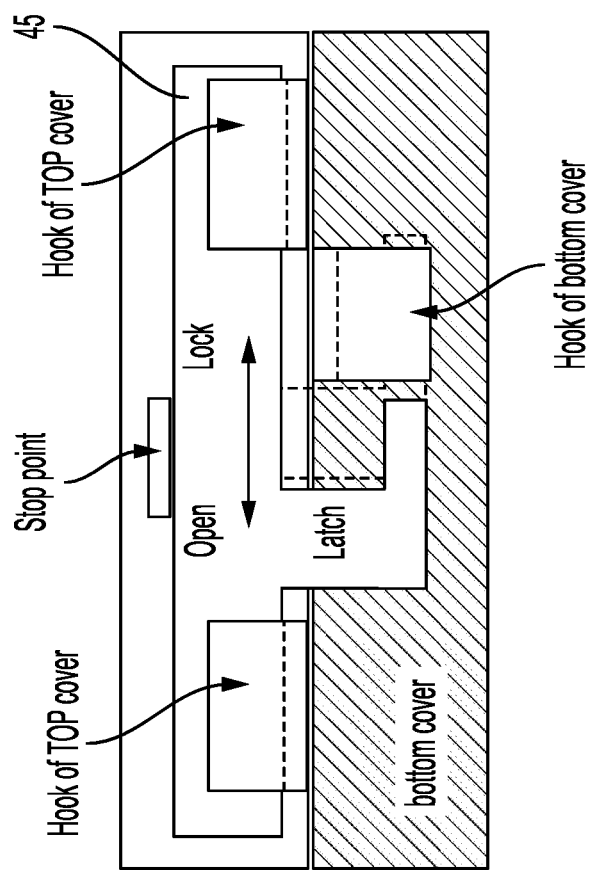

FIG. 6A and FIG. 6B show a third embodiment of a tape measure 1 according to the invention in which the housing 3 is openable to enable contaminants (which may have entered the housing during use of the tape measure 1) to be removed from the housing 3. The housing 3 is openable by means of a part 41 of the housing 3 being pivotably movable with respect to the remainder of the housing. The openable part 41 of the housing 3 is located at an underside of the housing (i.e. a portion of the housing which is normally the underside during normal use of the tape measure) and adjacent to the opening 15 in the housing 3 through which the measuring tape 5 may be extended from, and automatically retracted into, the housing. Specifically, the openable part 41 of the housing 3 is pivotable by means of a hinge 43 on one side of the housing and is latchable to the remainder of the housing on an opposite side of the housing. The opposite sides of the housing 3 are on opposite sides of the coiled measuring tape 5. The openable part 41 of the housing 3 is latchable to the remainder of the housing by means of a sliding latch 45 (e.g., a latch structure that is easy to open. Dust or other contaminants may be removed from the housing 3 when the openable part 41 of the housing is opened, such as by pouring out dust from the openable part 41, or cleaning the interior with the aid of an auxiliary tool 47, for example an air gun, air spray gun, or brush tool. The sliding latch 45 is shown in detail in FIGS. 7A and 7B.

FIGS. 8A, 8B, 8C, 8D, 9A, 9B and 10 show a fourth embodiment of a tape measure 1 according to the invention, in which the housing 3 contains wipers 49 configured to wipe contaminants C (e.g. dirt and water) from the measuring tape 5 as the measuring tape is retracted into the housing 3. Each wiper 49 is formed, at least in part, from an elastomeric material (e.g., TPR), and has a generally V-shaped front face 51 which faces towards the front opening 15 in the housing (i.e. the front opening 15 through which the measuring tape 5 may be extended from, and automatically retracted into, the housing 3). The apex 53 of the V-shape of each wiper 49 extends substantially perpendicular to the measurement surface 55 of the measuring tape 5, such that the portions of the wiper front face 51 on each side of the apex 53 are angled backwards away from the front opening 15 in the housing 3. As illustrated, there are two wipers 49 adjacent to the measurement surface 55 of the measuring tape 5, and there may also be corresponding wipers adjacent to the opposite, underside, surface of the measuring tape 5. As shown, the wipers 49 are arranged spaced apart from each other in the direction away from the front opening 15 in the housing 3. Each wiper 49 is shaped and arranged to provide substantial contact with the measurement tape 5, i.e. shaped to correspond to a U-shaped profile of the measurement tape. Each wiper 49 is attached to the housing 3 by slotting into lateral grooves 57 provided on the housing. In an embodiment each wiper 49 may be replaced with those that follow the different curvature of different blades of measuring tape 5. Additionally, there is a plurality of side openings 59 in the housing 3, each being adjacent to a corresponding wiper front face 51, to allow contaminants wiped from the measuring tape 5 to be expelled (e.g., fall out) from the housing 3. It may be appreciated that multiple stages (e.g., multiple wipers 49 and openings 59) make the measuring tape 5 cleaner through each stage). The V-shaped front face 51 of each wiper 49 causes the contaminants to be automatically expelled from the housing 3 through the side openings 59 as the measuring tape 5 is retracted into the housing 3.

Figure 11:
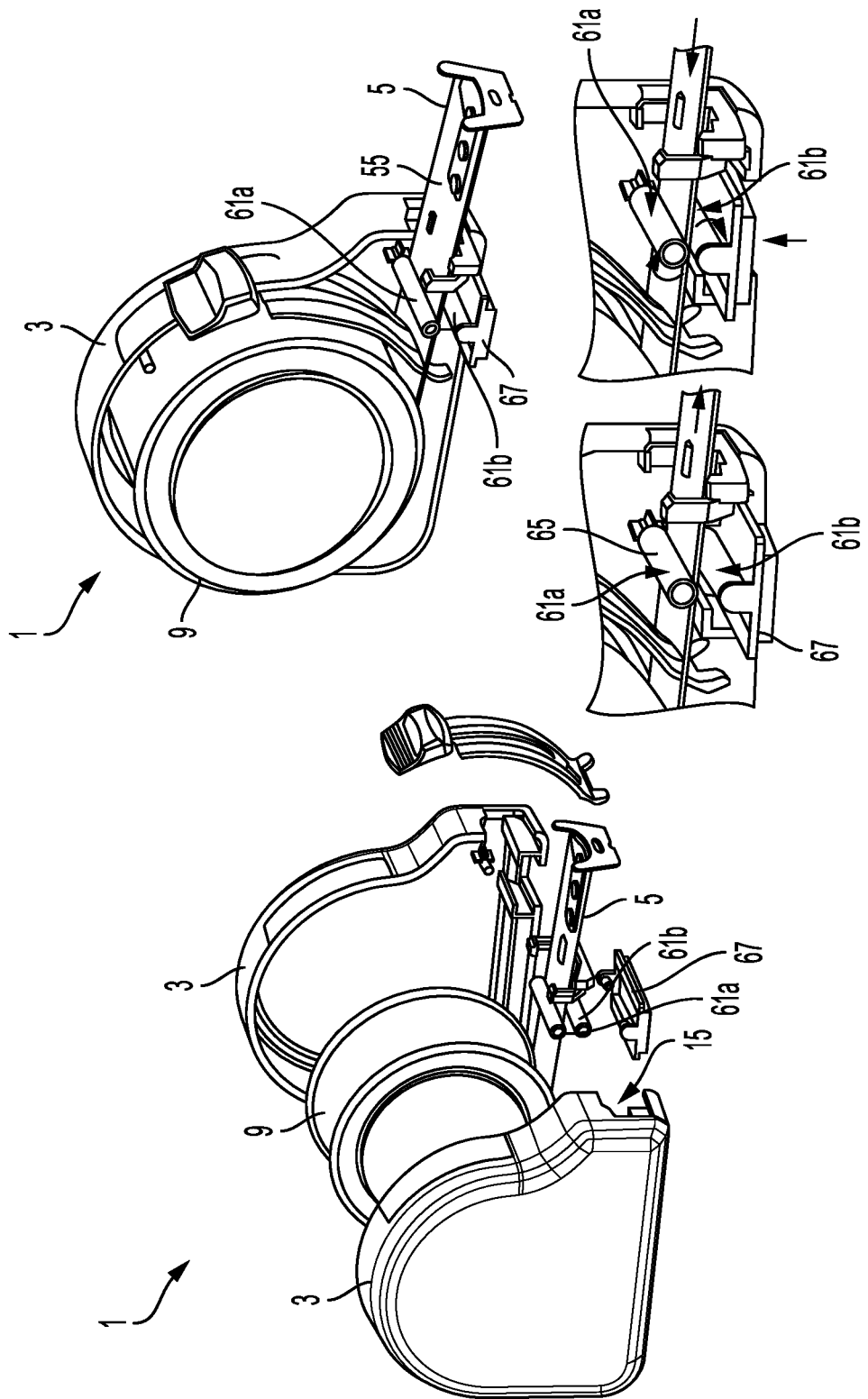
FIG. 11 shows illustrations of a fifth embodiment of the invention.
Figure 12:
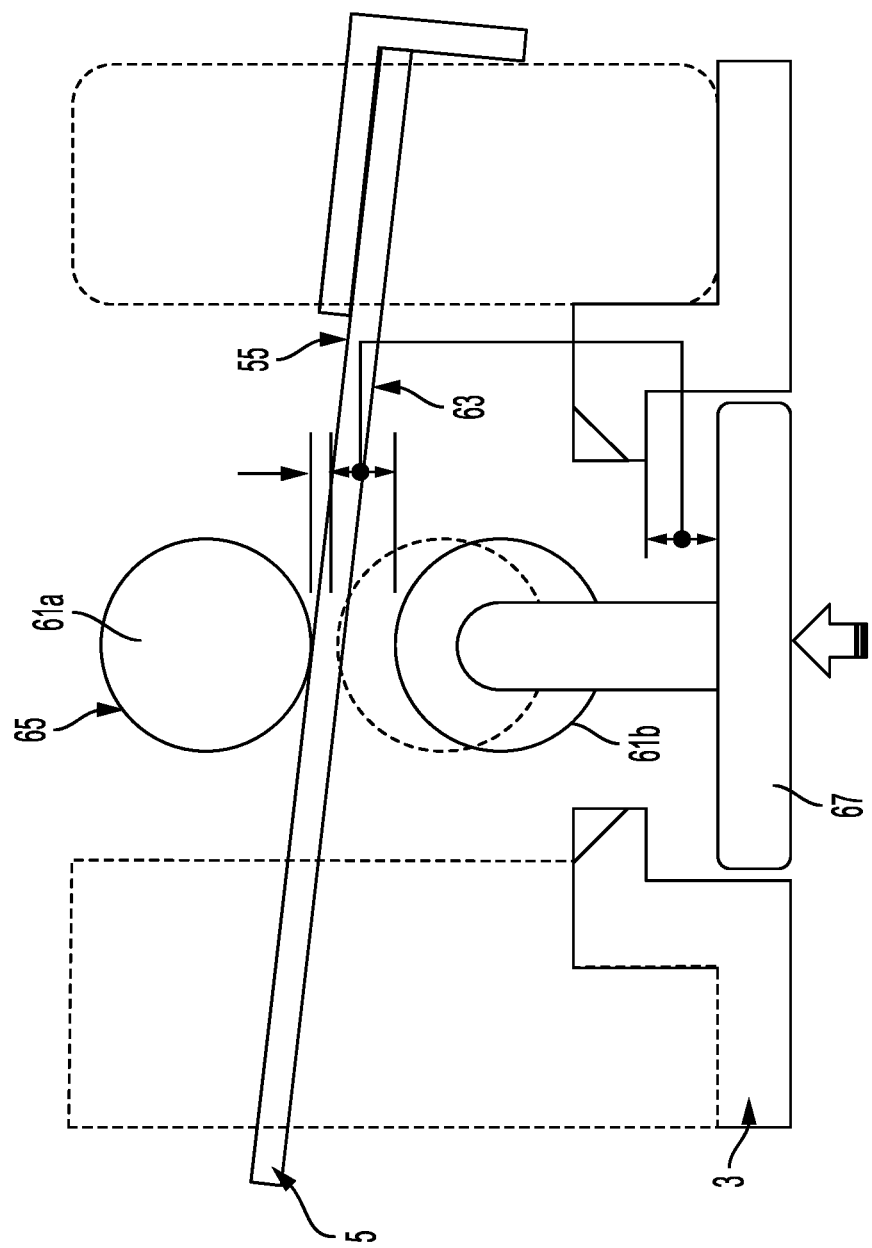
FIG. 12 shows another illustration of part of the fifth embodiment of the invention.

FIGS. 11 and 12 show a fifth embodiment of a tape measure 1 according to the invention, in which the housing 3 includes a pair of rollers 61 configured to contact the measurement surface 55 and the opposite major surface 63 of the measuring tape 5 as the measuring tape is retracted into the housing 3. Each, roller has an adherent (i.e. "sticky") surface 65 arranged to remove dust or other contaminants from the measuring tape 5 as the measuring tape is retracted into the housing 3 (e.g., similar to the action of a lint roller for removing lint from clothing). In an embodiment the rollers 61 may be washable. There is one roller 61*a* adjacent to the (upper) measurement surface 55 of the measuring tape 5, and an additional roller 61*b* adjacent to the opposite (lower) major surface 63 of the measuring tape 5. The rollers 61*a* and 61*b* adjacent to the opposite major surfaces of the measuring tape 5 are directly opposite each other, such that a plane extending through their rotational axes is substantially perpendicular to the major surfaces of the measuring tape 5. Roller 61*b* adjacent to the lower major surface 63 of the measuring tape 5 is movable towards and away from the measuring tape 5. In particular, roller 61*b* is resiliently biased (e.g. by means of one or more springs, not shown) to be spaced apart from the measuring tape 5, and is movable into contact with the measuring tape 5 against the resilient bias. To this end, the movable roller 61*b* is mounted on a movable part 67 which is accessible to the user from the exterior of the housing 3, and is movable by the user with respect to the housing 3 against the resilient bias. The rollers 61*a* and 61*b* may therefore be squeezed against opposite major surfaces of the measuring tape 5. In an embodiment, a gap between the movable part 67 and the housing 3 may be approximately the same as a gap between the measuring tape 5 and the roller 67*b* prior to moving the movable part 67 and the roller 61*b*, so that pressing the movable part to move the roller 61*b* towards the roller 61*a* does not stop movement of the measuring tape 5 as it is retracted into the housing 3. In an embodiment, a gap remaining for the measuring tape 5 when the rollers 61 are pressed together may be approximately 0.5 mm The rollers 61*a* and 61*b* as illustrated are regular cylinders, but they may be shaped to correspond to the cross-sectional profile of the measuring tape, e.g. an upper roller may be substantially barrel-shaped, and preferably a lower roller may be inverse barrel-shaped (i.e. part "hour glass" shaped) to conform to a U-shaped profile of the measuring tape 5.

Figure 13:
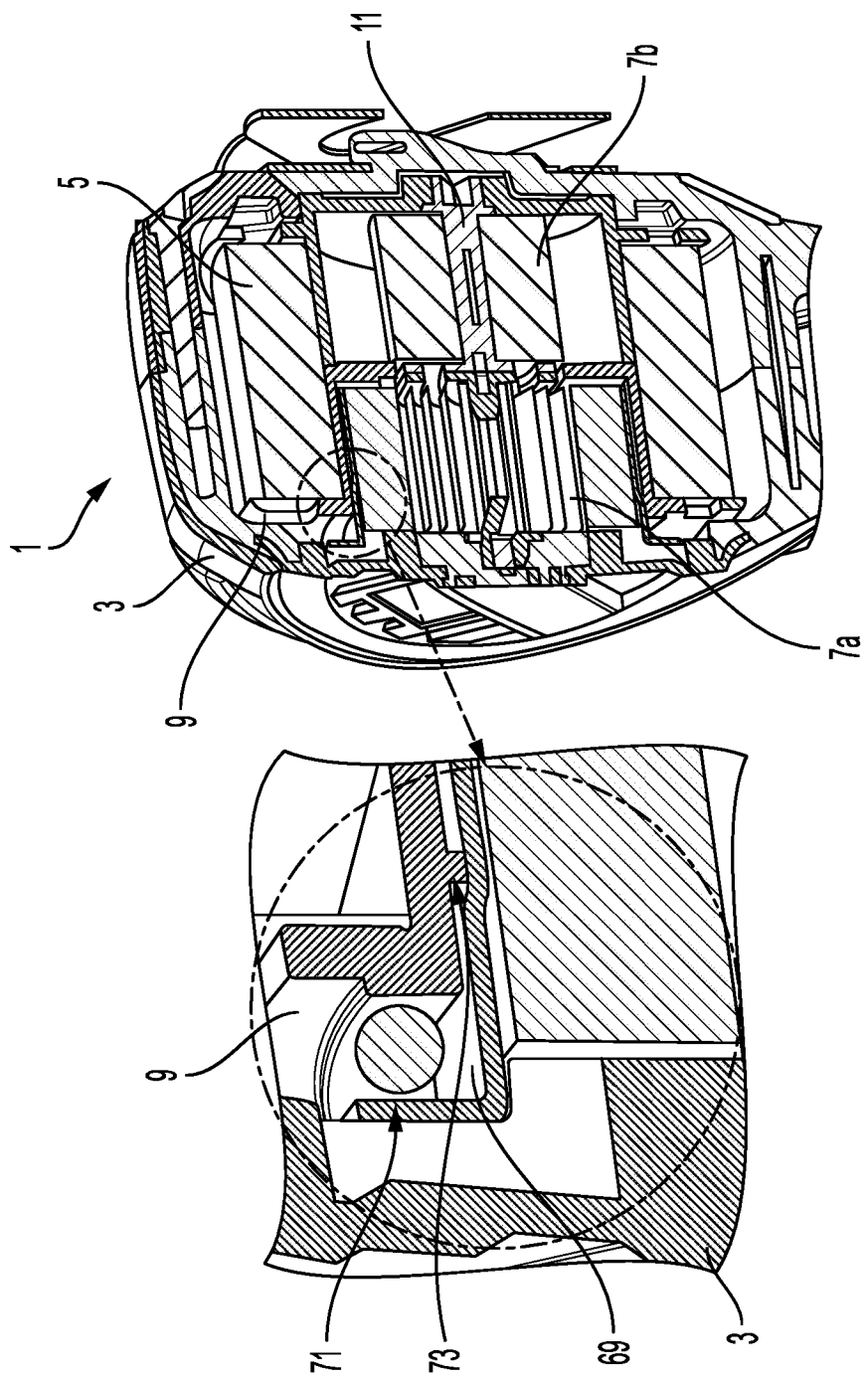
FIG. 13 shows a cross-sectional view, and a detail of the cross-sectional view, of a sixth embodiment of the invention.

FIG. 13 shows a cross-sectional view, and a detail of the cross-sectional view, of a sixth embodiment of the invention. In this embodiment of the invention, a tape measure 1 includes two elongate flexible spring members 7*a* and 7*b* situated adjacent to each other and coiled around a hub member 11, within housing 3 of the tape measure. The hub member 11 is rotatable with respect to the housing 3, and an innermost portion of each spring member 7*a*, 7*b*, is attached to the hub member. The outermost portion of spring member 7*b* is connected to the reel cartridge 9, and the outermost portion of spring member 7*a* is connected to a substantially rigid ring 69 which is non-rotatably fixed to the housing 3, and which preferably is formed from metal. The detail view shows schematic cross-sections of two seal members 71 and 73, one or both of which may be present, arranged to seal between the reel cartridge 9 and a part fixed to the housing 3, i.e. the substantially rigid ring 69. Seal member 71 is arranged to seal between the reel cartridge 9 and the substantially rigid ring 69 in a direction substantially parallel to the axis of the hub member 11, e.g. in the region of a flange portion 75 of the ring 69. Seal member 73 is arranged to seal between the reel cartridge 9 and the substantially rigid ring 69 in a substantially radial direction with respect to the axis of the hub member 11. Each of seal members 71 and 73 is in the form of an O-ring, e.g. formed from elastomeric or other polymeric material. Additionally, at least one O-ring seal member (not shown) may, or may not, be provided to seal between the hub member 11 and the reel cartridge 9, at least on the right hand side of the hub member as drawn.

Figure 14:
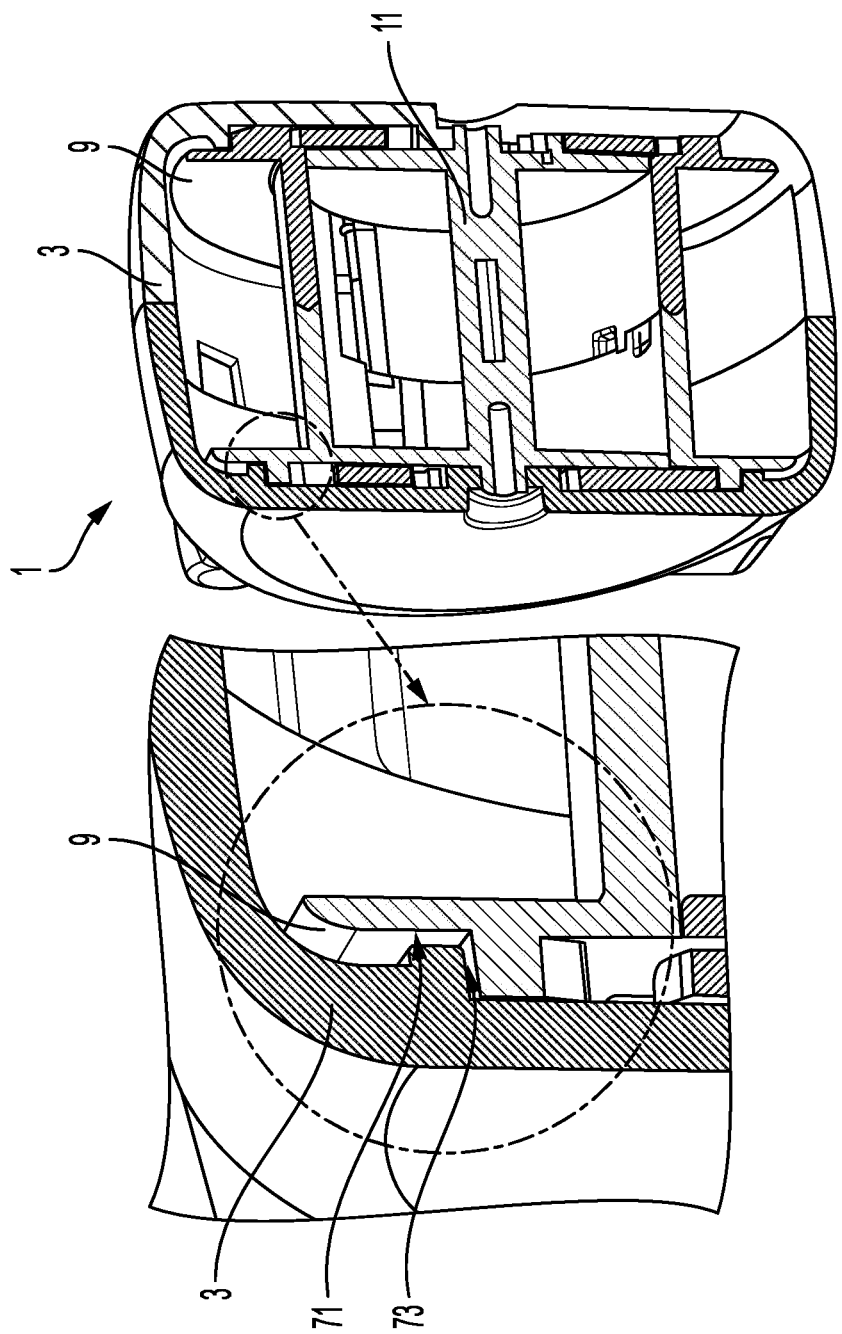
FIG. 14 shows a cross-sectional view, and a detail of the cross-sectional view, of a seventh embodiment of the invention.

FIG. 14 shows a cross-sectional view, and a detail of the cross-sectional view, of a seventh embodiment of a tape measure 1 of the invention, with the measuring tape 5 and the spring member 7 omitted, for clarity. In this embodiment of the invention, the tape measure 1 includes axial 71 and/or radial 73 seal members for sealing between the reel cartridge 9 and the housing 3 of the tape measure. Each of seal members 71 and 73 is in the form of an O-ring, e.g. formed from elastomeric or other polymeric material. Additionally, O-ring seal members (not shown) may, or may not, be provided to seal between the hub member 11 and the reel cartridge 9.

It is to be understood that the described and illustrated embodiments of the invention are examples, and that other embodiments fall within the scope of the claimed invention.

As an example, in an eighth embodiment, a claimed invention may recite a tape measure, comprising a housing; and contained in the housing: an elongate flexible measuring tape, an elongate flexible spring member, a hollow reel cartridge, and a hub member; wherein the hub member is attached to, or part of, the housing and extends through the reel cartridge along a rotational axis of the reel cartridge; wherein the reel cartridge is mounted on, and/or surrounds at least part of, the hub member and is rotatable with respect to the housing; wherein the measuring tape is coiled around an external surface of the reel cartridge; wherein the spring member is coiled inside the housing such that the spring member is connected directly or indirectly to the hub member; and wherein the housing includes an opening through which the measuring tape may be extended from the housing and automatically retracted into the housing.

In a ninth embodiment, a claimed invention may recite a tape measure according to the claimed invention of the eighth embodiment, further comprising one or more first seal members provided, preferably on the reel cartridge, to seal between the reel cartridge and the hub member and/or to seal between the reel cartridge and the housing and/or a part fixed to the housing, the, or each, first seal member preferably having a generally circular shape and preferably formed, at least in part, from elastomeric material.

In a tenth embodiment, a claimed invention may recite a tape measure according to the claimed invention of the ninth, wherein the, or each, first seal member includes one or more generally rigid support members and/or spring members, preferably formed from metal, such support member(s) preferably having a generally circular shape.

In an eleventh embodiment, a claimed invention may recite a tape measure according to the claimed invention of the ninth or tenth embodiments, wherein the, or each, first seal member includes at least one sealing lip, and preferably, the, or each, seal member has a generally U-shaped radial cross-section.

In a twelfth embodiment, a claimed invention may recite a tape measure according to the claimed invention of the ninth through eleventh embodiments, wherein the, or each, first seal member is arranged to rotate with the reel cartridge, with respect to the hub member and/or the housing.

In a thirteenth embodiment, a claimed invention may recite a tape measure according to the claimed invention of the eighth through twelfth embodiments, wherein an outermost coil portion of the spring member extends out of the reel cartridge through an opening in the reel cartridge and is attached to an innermost coil portion of the measuring tape, and a second seal member is provided on the reel cartridge, to seal between the spring member and the reel cartridge where the spring member extends out of the reel cartridge.

In a fourteenth embodiment, a claimed invention may recite a tape measure according to the claimed invention of the thirteenth embodiment, wherein the second seal member includes a slit through which the outermost coil portion of the spring member extends, and wherein the second seal member preferably comprises an elongate elastomeric part.

In a fifteenth embodiment, a claimed invention may recite a tape measure according to the claimed invention of the thirteenth or fourteenth embodiments, wherein the second seal member may be attached to the reel cartridge by inter-engagement, preferably interlocking engagement, therewith.

In a sixteenth embodiment, a claimed invention may recite a tape measure according to the claimed invention of the eighth through twelfth embodiments, wherein the spring member is completely contained within the reel cartridge, and an outermost coil portion of the spring member is attached to an interior portion of the reel cartridge.

In a seventeenth embodiment, a claimed invention may recite a tape measure according to the claimed invention of the sixteenth embodiment, wherein an external surface of the reel cartridge includes an attachment portion to which an innermost coil portion of the measuring tape is attached.

In an eighteenth embodiment, a claimed invention may recite a tape measure according to the claimed invention of the seventeenth embodiment, wherein the attachment portion comprises one or more protrusions, preferably one or more fingers and/or barbs.

In a nineteenth embodiment, a claimed invention may recite a tape measure according to the claimed invention of the seventeenth or eighteenth embodiments, wherein the innermost coil of the measuring tape includes at least one attachment portion, preferably at least one opening and/or protrusion, for attaching the measuring tape to the reel cartridge.

In a twentieth embodiment, a claimed invention may recite a tape measure according to the claimed invention of the eighth through nineteenth embodiments, wherein the housing is openable to enable contaminants to be removed from the housing, preferably by means of a part of the housing being pivotably and/or slidably and/or flexibly attached to, and movable with respect to, the remainder of the housing.

In a twenty-first embodiment, a claimed invention may recite a tape measure according to the claimed invention of the twentieth embodiment, wherein the openable part of the housing is located at an underside of the housing and/or adjacent to the opening in the housing through which the measuring tape may be extended from, and automatically retracted into, the housing.

In a twenty-second embodiment, a claimed invention may recite a tape measure according to the claimed invention of the twenty-first embodiment, wherein the openable part of the housing is hinged or otherwise pivotable or flexible on one side of the housing, and latchable to the remainder of the housing on an opposite side of the housing, preferably by means of a sliding latch.

Accordingly, while various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment.

What is claimed is:

1. A tape measure, comprising a housing; and contained in the housing: an elongate flexible measuring tape, an elongate flexible spring member, a hollow reel cartridge, and a hub member; wherein the hub member extends through the reel cartridge along a rotational axis of the reel cartridge; wherein the reel cartridge is mounted on, and/or surrounds at least part of, the hub member and is rotatable with respect to the housing; wherein the measuring tape is coiled around an external surface of the reel cartridge; wherein the spring member is coiled inside the housing such that the spring member is connected directly or indirectly to the hub member; and wherein the housing includes an opening through which the measuring tape may be extended from the housing and automatically retracted into the housing.

2. A tape measure according to claim 1, further comprising one or more first seal members provided, preferably on the reel cartridge, to seal between the reel cartridge and the hub member and/or to seal between the reel cartridge and the housing and/or a part fixed to the housing, the, or each, first seal member preferably having a generally circular shape and preferably formed, at least in part, from elastomeric material.

3. A tape measure according to claim 2, wherein the, or each, first seal member includes one or more generally rigid support members and/or spring members, preferably formed from metal, such support member(s) preferably having a generally circular shape.

4. A tape measure according to claim 2, wherein the, or each, first seal member includes at least one sealing lip, and preferably, the, or each, seal member has a generally U-shaped radial cross-section.

5. A tape measure according to claim 2, wherein the, or each, first seal member is arranged to rotate with the reel cartridge, with respect to the hub member and/or the housing.

6. A tape measure according to claim 1, wherein an outermost coil portion of the spring member extends out of the reel cartridge through an opening in the reel cartridge and is attached to an innermost coil portion of the measuring tape, and a second seal member is provided on the reel cartridge, to seal between the spring member and the reel cartridge where the spring member extends out of the reel cartridge.

7. A tape measure according to claim 6, wherein the second seal member includes a slit through which the outermost coil portion of the spring member extends, and wherein the second seal member preferably comprises an elongate elastomeric part.

8. A tape measure according to claim 6, wherein the second seal member may be attached to the reel cartridge by inter-engagement, preferably interlocking engagement, therewith.

9. A tape measure according to claim 1, wherein the spring member is completely contained within the reel cartridge, and an outermost coil portion of the spring member is attached to an interior portion of the reel cartridge.

10. A tape measure according to claim 9, wherein an external surface of the reel cartridge includes an attachment portion to which an innermost coil portion of the measuring tape is attached.

11. A tape measure according to claim 10, wherein the attachment portion comprises one or more protrusions, preferably one or more fingers and/or barbs.

12. A tape measure according to claim 10, wherein the innermost coil of the measuring tape includes at least one attachment portion, preferably at least one opening and/or protrusion, for attaching the measuring tape to the reel cartridge.

13. A tape measure according to claim 1, wherein the housing is openable to enable contaminants to be removed from the housing, preferably by means of a part of the housing being pivotably and/or slidably and/or flexibly attached to, and movable with respect to, the remainder of the housing.

14. A tape measure according to claim 13, wherein the openable part of the housing is located at an underside of the housing and/or adjacent to the opening in the housing through which the measuring tape may be extended from, and automatically retracted into, the housing.

15. A tape measure according to claim 14, wherein the openable part of the housing is hinged or otherwise pivotable or flexible on one side of the housing, and latchable to the remainder of the housing on an opposite side of the housing, preferably by means of a sliding latch.

* * * * *